United States Patent [19]
Kircher

[11] Patent Number: 5,270,906
[45] Date of Patent: Dec. 14, 1993

[54] SWIVELLABLE FASTENING SYSTEM FOR A HEADLIGHT UNIT

[75] Inventor: Günter Kircher, Tiefenbronn, Fed. Rep. of Germany

[73] Assignee: Dr. Ing. h.c.F. Porsche AG, Fed. Rep. of Germany

[21] Appl. No.: 991,176

[22] Filed: Dec. 16, 1992

[30] Foreign Application Priority Data

Jan. 11, 1992 [JP] Japan .................................. 4200508

[51] Int. Cl.$^5$ .............................................. B60Q 1/06
[52] U.S. Cl. .................................................... 362/66
[58] Field of Search ........................................ 362/66

[56] References Cited

U.S. PATENT DOCUMENTS 3,934,134 1/1976 Wassel .................................. 240/57
5,207,747 5/1993 Godin et al. ........................... 362/66

Primary Examiner—Carroll B. Dority
Attorney, Agent, or Firm—Evenson, McKeown, Edwards & Lenahan

[57] ABSTRACT

A swivellable fastening system for a headlight unit on an excavator comprises a jib which is pivotally connected in a jib swivel block and which, by way of a working cylinder connected with a crank mechanism, can be swivelled into several working positions as well as into a transport position deposited on the excavator body. By way of a holding arrangement, which is supported in bearings of a connecting control arm of the crank mechanism, the headlight unit is swivellably fastened in such a manner that, in the transport position of the jib, the unit is arranged approximately in a vertical transverse plane of the vehicle with a fixedly arranged other headlight unit and has a cone of light aligned in the driving direction which has an angle α. The headlight unit can be swivelled into the working position by the connecting control arm.

11 Claims, 2 Drawing Sheets

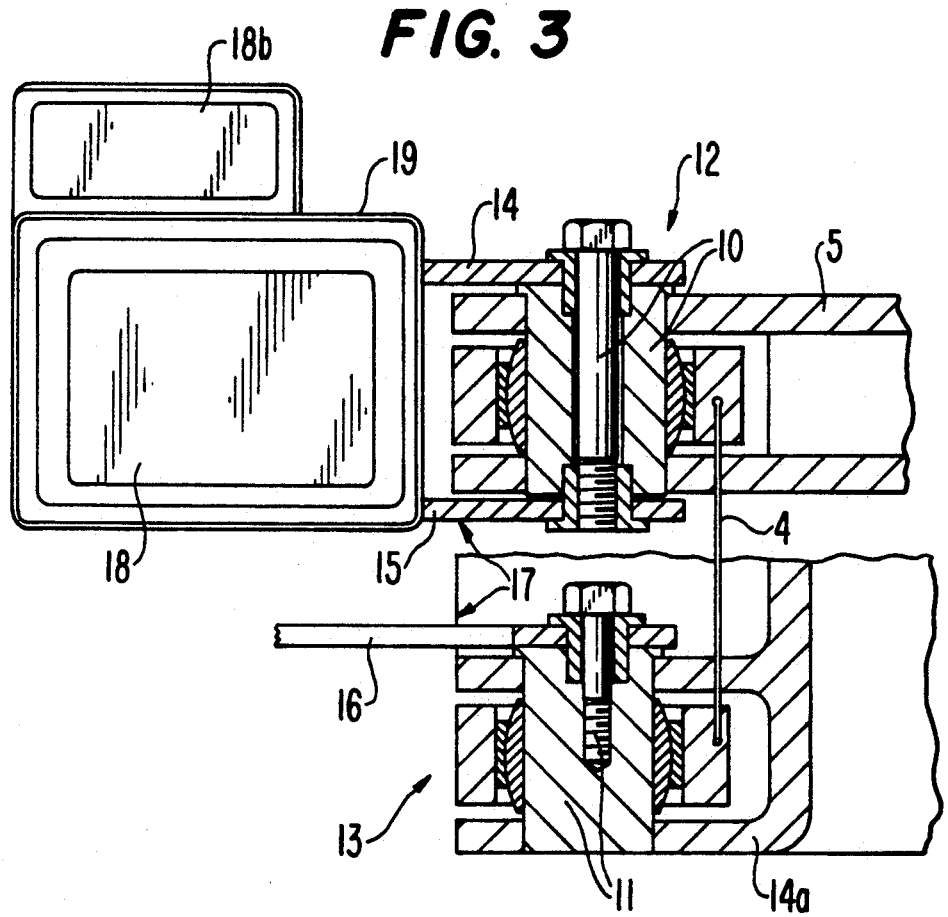

SWIVELLABLE FASTENING SYSTEM FOR A HEADLIGHT UNIT

BACKGROUND AND SUMMARY OF THE INVENTION

This invention relates to a swivellable fastening system for a headlight unit and, more particularly, to a swivellable fastening system for a headlight unit on an excavator which includes a jib which is pivotally connected in a jib swivel block and which, by way of a working cylinder connected with a crank mechanism, can be swivelled into several working positions as well as into a transport position deposited on the excavator body.

In the case of utility vehicles it is known, for example see U.S. Pat. No. 3,934,134, to fasten headlights on control arms in such a manner that, with each movement of the working shovel, the headlight is correspondingly moved along.

It is an object of the present invention to provide a headlight unit on an excavator which is used only for driving in highway traffic.

According to the present invention, this object is achieved by a swivellable fastening system for a headlight unit on an excavator which includes a jib which is pivotally connected in a jib swivel block and which, by way of a working cylinder connected with a crank mechanism, can be swivelled into several working positions as well as into a transport position deposited on the excavator body. The headlight unit, by way of a holding arrangement supported in bearing arrangements of a connecting control arm of the crank mechanism, is fastened in a swivellable manner such that the headlight unit, in the transport position of the jib, is arranged approximately in a vertical transverse plane (X—X) of the vehicle with another headlight unit arranged in a fixed manner. The headlight unit has a cone of light with an angle (a) aligned in the driving direction. The headlight unit can be swivelled into the working position with the connecting control arm.

The principal advantages achieved by means of the invention are that, in the case of an excavator, because of the fissured forward structure, a fastening system of a headlight unit on the vehicle, which corresponds to regulations, cannot be sufficiently achieved.

In order to arrange the two headlight units in approximately the same vehicle transverse plane in the forward area of the excavator for driving on a road, the one headlight unit arranged on the right side, because of a lack of a fastening site, is fastened on the vehicle body on bearings of a crank mechanism of the jib, for example.

The connection of this headlight unit is accomplished by way of a holding arrangement which includes connecting arms which are held on pins of the bearing arrangements for a connecting control arm of the crank mechanism.

As a result, the movement of one headlight unit corresponds to the movement of the connecting control arm. In the transport position of the jib, that is, when the headlight unit is deposited against the driving direction in parallel to the longitudinal axis of the vehicle on the excavator body, the headlight unit takes up a position in which the center axis of the unit extends in the longitudinal direction of the vehicle and, together with another headlight unit which is fixedly disposed on the vehicle body, is arranged approximately in a transverse plane. By means of this arrangement, the cone of light of the movably arranged headlight unit is arranged in an unimpaired manner corresponding to the other unit and has a maximal scatter.

When the jib is swivelled into a working position, the headlight unit moves along in a corresponding manner and, in the case of a maximal swivel position of the jib close to the outer wall of the body, takes up a position in such a manner that the center axis of the headlight unit extends in the transverse direction of the vehicle.

The headlight can be adjusted in a longitudinal plane as well as in the transverse direction and in the vertical direction, for example, in the bearing arrangements and/or by the stop and/or by the connecting control arms. A tolerance and deformation compensation is also possible. In particular according to the invention, it is important that, for this purpose, the rear pin (with respect to the driving direction) is held in an oblong hole of the plate. Furthermore, for the compensation, the forward pin is held in an oblong hole of the bearing arrangement.

Other objects, advantages and novel features of the present invention will become apparent from the following detailed description of the invention when considered in conjunction with the accompanying drawings.

BRIEF DESCRIPTION OF THE DRAWINGS

FIG. 3 is a sectional view of the bearing arrangement of a connecting control arm with a headlight unit held by means of supporting arms.

DETAILED DESCRIPTION OF THE DRAWINGS

Figure 1:
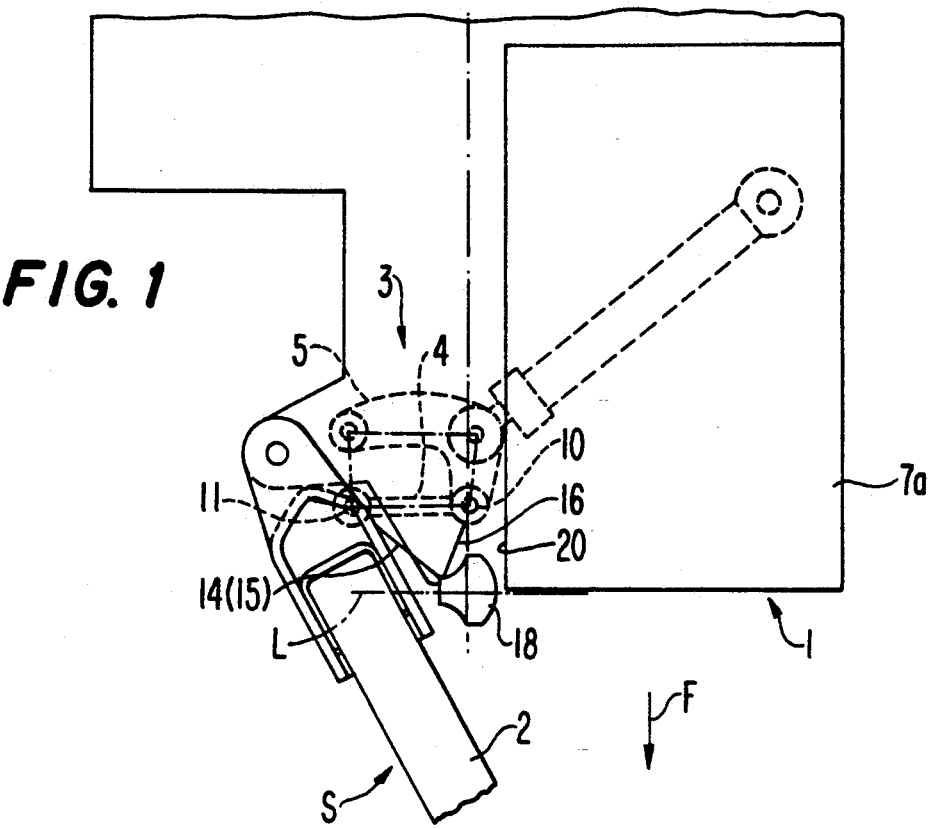
FIG. 1 is a top view of an excavator with a jib pivotally connected by way of a crank mechanism in the maximal working position.
Figure 2:
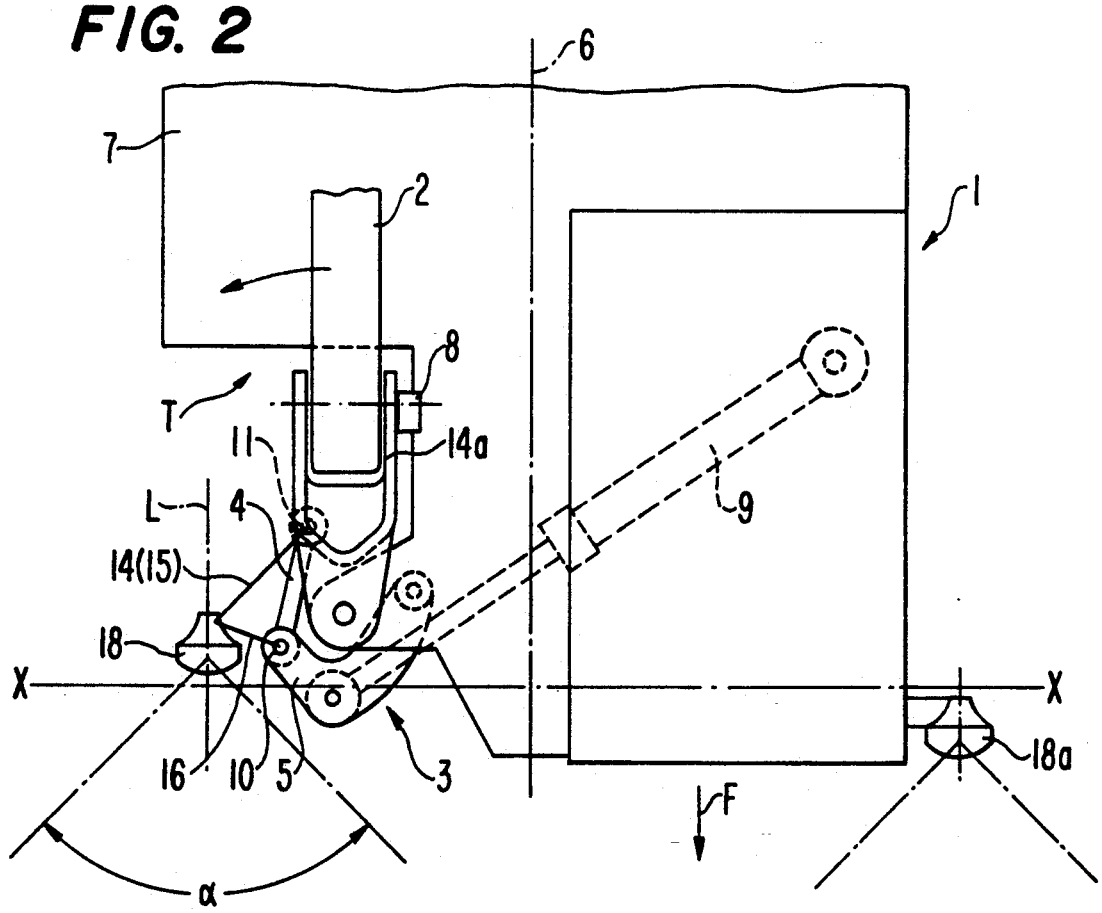
FIG. 2 is a top view of an excavator according to the present invention, having a jib arranged in the transport position.

Referring to FIGS. 1 and 2, an excavator 1 is equipped with a jib 2 which carries a dredging shovel (not shown) on its end side and, via a crank mechanism 3 including a connecting control arm 4 and an angle lever 5, can be adjusted into a deposited transport position T (FIG. 2) and into several working positions as well as into a shown maximal swivel position S (FIG. 1).

In the transport position T, the jib 2 is swivelled toward the rear (against the driving direction F) into a position in parallel with respect to the longitudinal axis 6 of the vehicle. The jib 2 is deposited on the vehicle body 7. By way of a stop 8, the position of the jib 2 is precisely fixed. A swivelling of the jib 2 out of the transport position T into the working position S is caused by way of a working cylinder 9.

As shown in FIG. 3, the connecting control arm 4 is held on pins 10 and 11 of the forward bearing arrangement 12 and of a rearward bearing arrangement 13, with respect to the driving direction F. The forward bearing arrangement 12 is supported on the angle lever 5, and the additional rearward bearing arrangement 13 is supported on a jib swivel block 14a. Arms 14, 15, 16, a holding arrangement 17 and a housing 19 of a headlight unit 18 are connected with the pins 10 and 11 of the bearing arrangements 12 and 13. The two arms 14 and 16 situated on top may also be formed by a plate element.

As illustrated in detail in FIG. 2, the headlight unit 18 of the right vehicle side is arranged in a transverse plane X—X of the vehicle with the additional headlight unit 18a of the left side of the vehicle. The headlight unit 18 is arranged with its longitudinal center axis L in parallel to the center axis 6 of the vehicle, and the cone of light is aligned with the angle α in the driving direction F and is free from obstruction by the vehicle components.

In this position of the headlight unit 18, the jib 2 or the jib swivel block 14a are held on the stop 8 so that, in this transport end position L, a position of the headlight unit 18 is ensured in parallel with respect to the longitudinal axis L of the vehicle.

When the jib 2 is swivelled into working positions, the headlight unit 18, because of its connecting to the pins 10, 11, swivels along in a corresponding manner. In the case of the maximum swivel position, as illustrated in FIG. 1, the center axis L of the headlight unit 18 is arranged transversely with respect to the vehicle and is directly opposite to the body wall 20 of the excavator 1.

The arms 14, 15 and 16 are connected with the housing 19 of the unit 18 and reach around the angle lever 5 from both sides so that a stable holding arrangement 17 is formed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A swivellable fastening system for a headlight unit on a vehicle which includes a jib pivotally connected in a jib swivel block, said jib being swivellable via a working cylinder connected with a crank mechanism into several working positions including a transport position in which the jib is arranged on the vehicle body, comprising:
   a holding arrangement for the headlight unit;
   a connecting control arm of the crank mechanism having bearing arrangements for fastenably supporting the headlight unit in a swivellable manner;
   wherein the headlight unit is arranged approximately in a vertical transverse plane of the vehicle in the transport position along with a second headlight unit arranged in a fixed manner, said headlight unit on said holding arrangement having a cone of light formed with an angle aligned in a driving direction and being swivellable into the working position with said connecting control arm.

2. A swivellable fastening system according to claim 1 wherein said vehicle is an excavator.

3. A swivellable fastening system according to claim 1, wherein the jib in the transport position is positioned on a stop and the headlight unit is arranged to be aligned in the driving direction.

4. A swivellable fastening system according to claim 2, wherein the headlight unit on said holding arrangement, in the case of a maximum swivel position with respect to the vehicle body is held by way of the holding arrangement in a position arranged transversely with respect to the vehicle body and directly opposite an outer wall of a revolving superstructure of the excavator.

5. A swivellable fastening system according to claim 1, wherein the holding arrangement, with respect to the driving direction, comprises arms of a housing for the headlight unit, said arms reaching around a forward one of said bearing arrangements, a further arm being connected with a rear one of said bearing arrangements.

6. A swivellable fastening system according to claim 1, wherein arms are each connected with the connecting control arm by way of pins of the bearing arrangements.

7. A swivellable fastening system according to claim 3, wherein arms are each connected with the connecting control arm by way of pins of the bearing arrangements.

8. A swivellable fastening system according to claim 1, wherein arms are arranged in an upper horizontal plane and form a plate element.

9. A swivellable fastening system according to claim 3, wherein arms are arranged in an upper horizontal plane and form a plate element.

10. A swivellable fastening system according to claim 4, wherein arms are arranged in an upper horizontal plane and form a plate element.

11. A swivellable fastening system according to claim 1, wherein the headlight unit comprises a flasher.

* * * * *